March 10, 1959
L. J. ROUSSEAU
2,876,472
PORTABLE VEHICLE WASHING MACHINE
Filed April 12, 1954
3 Sheets-Sheet 1
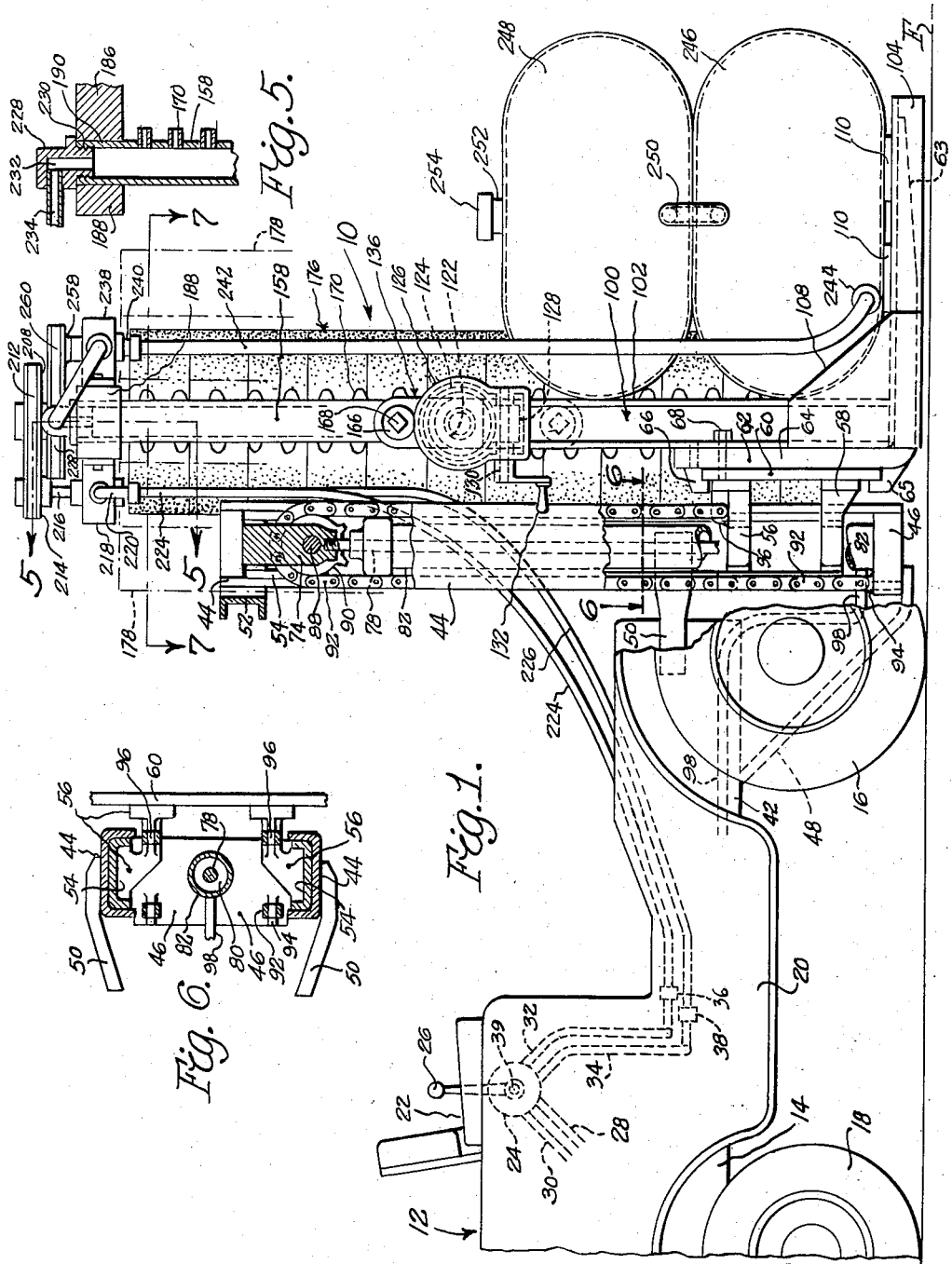
INVENTOR.
Leo J. Rousseau
BY
Barthel + Bugbee
Attys

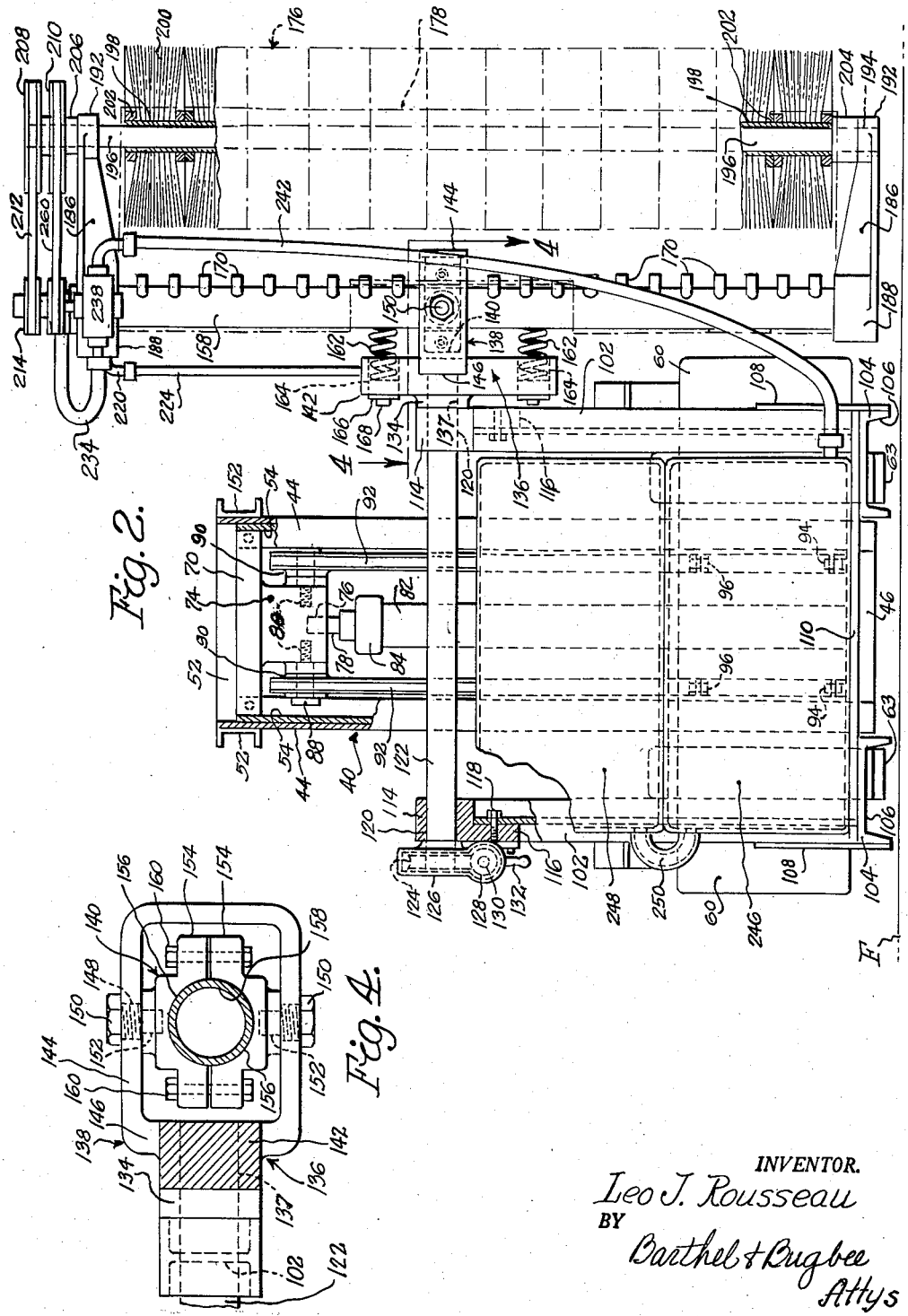

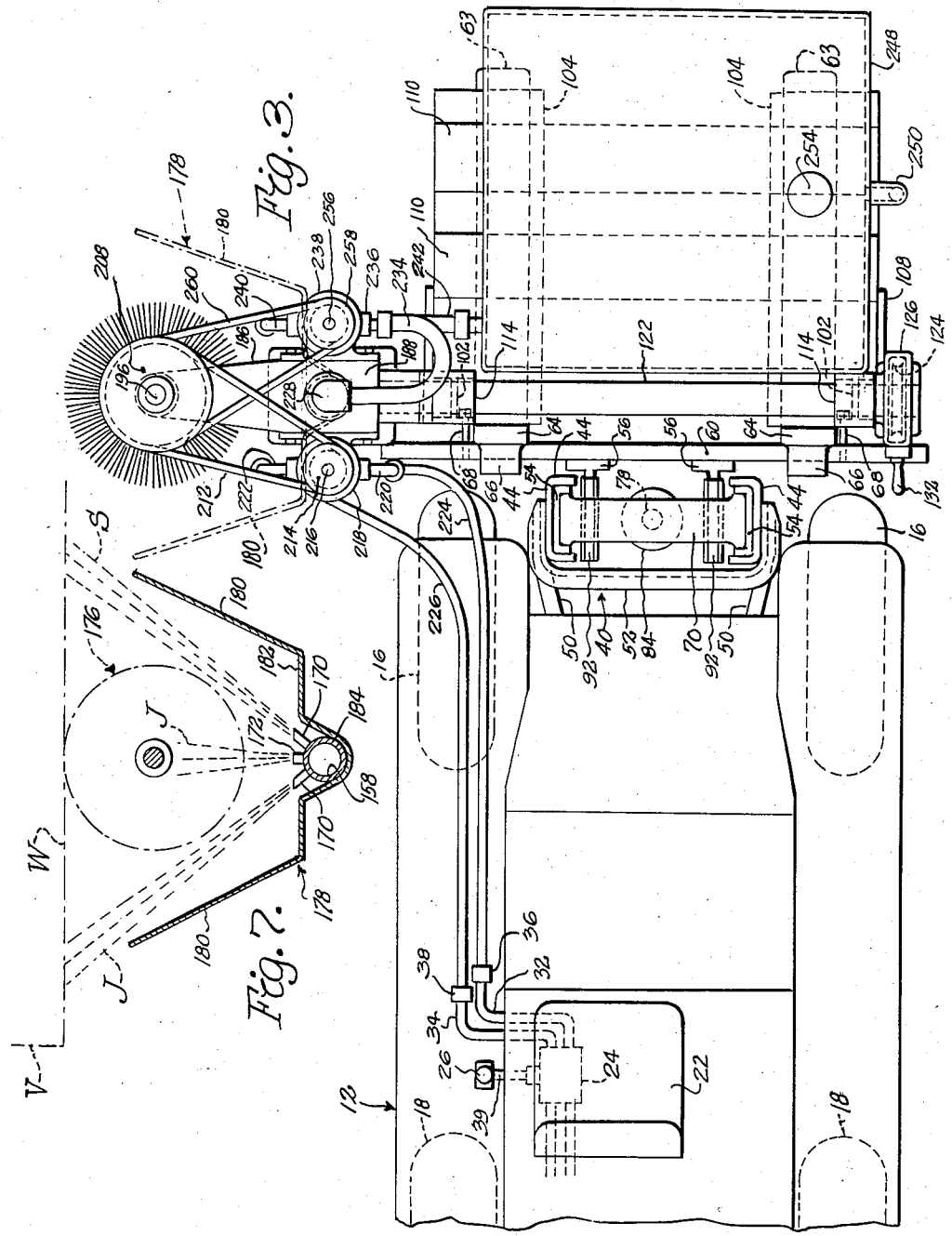

United States Patent Office 2,876,472
Patented Mar. 10, 1959

2,876,472

PORTABLE VEHICLE WASHING MACHINE

Leo J. Rousseau, Grosse Pointe Park, Mich., assignor to Minit-Man, Inc., Detroit, Mich., a corporation of Michigan Application April 12, 1954, Serial No. 422,341

5 Claims. (Cl. 15—21)

This invention relates to washing machines and, in particular, to vehicle washing machines.

One object of this invention is to provide a portable vehicle washing machine which is adapted to be transported, powered, and manipulated by a conventional self-propelled industrial truck, such as the so-called fork-lift truck.

Another object is to provide a portable vehicle washing machine which can be driven to and along the vehicle to be washed, thereby eliminating the necessity for bringing the vehicle to the stationary washing machines hitherto used for large vehicles, such as trucks, railway freight and passenger cars, and motor buses.

Another object is to provide a portable vehicle washing machine of the foregoing character employing a roughly cylindrical rotary brush which can be raised or lowered, tilted and swung around pivots at the will of the operator so as to adapt the brush to reach and thoroughly wash surfaces at different inclinations or of varying contour.

Another object is to provide a portable vehicle washing machine of the foregoing character wherein the machine is completely self-contained, in that it carries its own water supply and receives power for rotating the brush and for placing the washing water under pressure from the power-driven industrial truck which transports it from place to place.

Another object is to provide a portable vehicle washing machine of the foregoing character wherein the brush, brush mount, brush-rotating motor, water pump and water tank are mounted in a single compact unit which is self-contained except for the provision of the power required for manipulating and rotating the brush, so that the entire unit can be readily attached to and detached from a small transporting vehicle such as a self-propelled industrial truck, especially a so-called fork-lift truck, which truck is capable of independent use at all times other than when it is being employed for transporting and powering the vehicle washing machine of the present invention.

Other objects and advantages of this invention will become apparent during the course of the following description of the accompanying drawings, wherein:

Figure 1 is a side elevation, partly in vertical section, of a portable vehicle washing machine with the spray shield removed, according to one form of the present invention, as attached to a self-propelled industrial fork-lift truck;

Figure 2 is a front elevation, partly in vertical section, of the portable vehicle washing machine and industrial fork-lift truck shown in Figure 1;

Figure 3 is a top plan view of the portable vehicle washing machine and industrial fork-lift truck shown in Figures 1 and 2, with the spray shield indicated in dotted lines;

Figure 4 is a fragmentary horizontal section taken along the line 4—4 in Figure 2, showing details of the pivotal mounting of the rotary washing brush;

Figure 5 is a fragmentary vertical section taken along the line 5—5 in Figure 1, showing details of the water connection to the top of the hollow spray pipe;

Figure 6 is a fragmentary horizontal section taken along the line 6—6 in Figure 1, showing details of the lift mechanism of the fork lift truck; and Figure 7 is a horizontal section taken along the line 7—7 in Figure 1 showing the spray shields omitted from Figures 1 and 2.

Hitherto, the washing of large heavy and bulky vehicles such as railway freight and passenger cars, motor buses and trucks has been a slow and costly procedure because of the necessity of bringing the vehicle to and through the stationary washing machine hitherto provided for such purposes. This was particularly true in the case of railway freight and passenger cars which were not self-propelled and which ran only on tracks, so that was necessary to couple them to a locomotive and push or pull them to the stationary washing machine, a procedure accompanied by the further difficulty of having to switch the cars from track to track in order to bring them to and from the washing machine.

The present invention provides a portable washing machine which is quickly and easily attached to a conventional self-propelled industrial truck and carries its own water supply and pumping equipment so that the truck carries it to the vehicle and travels alongside the vehicle while the washing brush rotates as water is sprayed onto the surface of the vehicle being washed. Mechanism is provided for manipulating the brush so as to adapt it to be positioned against surfaces of varying inclination or configuration, and a floating resilient brush mount is provided in order to automatically assist such adaptation. The truck itself, preferably provides power, such as hydraulic pressure fluid, for rotating the brush, driving the water pump, and raising and lowering the machine bodily relatively to the vehicle being washed. In addition to the resilient mount for the brush, the brush mount can be swung bodily by means of mechanism provided for the purpose. When the washing operation has been completed, the machine is readily detached from the truck, which is then available for independent use until vehicle washing again becomes necessary.

Referring to the drawings in detail, Figures 1, 2 and 3 show a portable vehicle washing machine, generally designated 10, as attached to and transported and powered by a self-propelled industrial truck, generally designated 12, of the type known as a fork lift truck and widely used in factories for lifting and stacking boxes, packing cases or tote baskets on pallets. As will subsequently appear below, the washing machine 10 is substantially self-contained, except for power supply, and can be attached to and detached from the truck 12 in a rapid and easy manner.

The fork lift truck 12 is conventional and several forms are readily available upon the open market. The type shown is chosen merely to exemplify one form of such self-propelled lift truck, and it will be obvious that other types can be substituted in a manner which is readily apparent to those skilled in the automotive vehicle arts. As shown in Figures 1, 2 and 3, the fork lift truck 12 consist of a chassis 14 provided with self-propelled front and rear wheels 16 and 18 respectively and a body 20 carrying a driver's seat 22. The control mechanism for the truck 12, such as the steering wheel, hand levers and foot pedals, has been omitted for simplicity of showing, such details being well-known to those familiar with such fork trucks. Mounted beside the driver's seat 22, however, is a rotary valve 24 operated by a hand lever 26 to supply pressure fluid, such as oil under pressure, from service pipes 28 and 30 to service pipes 32 and 34 leading to couplings 36 and 38 from which a subsequently described connection is made to the portable washing machine 10. The valve 24 is of conventional construction and has an operating shaft 39 to which the hand lever 26 is connected. The service pipes 28 and 30 are connected to a conventional hydraulic circuit containing a power-driven hydraulic pump, this circuit and pump being already mounted upon the truck 12 and employed for other purposes. Accordingly, it is unnecessary to supply a separate source of power for the washing machine 10 since such hydraulic power is already available from the hydraulic circuit with which the truck 12 is conventionally equipped.

The lift mechanism, generally designated 40, with which the truck 12 is also conventionally equipped, is mounted on the front end of the vehicle frame members 42 and is supported by a pair of stationary vertical outer channel members 44 (Figure 6) which are secured at their lower ends to a lower cross member or base 46. The latter in turn is connected to the forwardly-extending lower ends of the inclined braces 48, the upper ends of which are connected to the frame members 42 (Figure 1). The stationary vertical channel members 44 are also braced by forwardly-extending horizontal arms 50, the forward ends of which are secured to the external sides of the channel members 44 and the rearward ends to the chassis 14. The upper ends of the channel members 44 are interconnected by a C-shaped upper channel cross member 52.

Slidably mounted within the outer stationary channel members 44 are inner channel members 54 (Figure 6), the lower ends of which carry outwardly-projecting upper and lower arms 56 and 58 respectively, to the forward ends of which is connected a horizontally-elongated vertical back plate 60. The back plate 60 serves as a support for a pair of L-shaped forks 62 having forwardly-extending horizontal lifting arms 63 and vertical arms 64 with lower and upper notched lugs 65 and 66 respectively engaging the lower and upper edges of the back plate 60 (Figs. 1 and 2), the upper notched lug 66 being removable, the lower lug 65 being fixed (Figure 1). The back plate 60 is drilled and threaded to receive bolts 68 for a purpose explained below. The upper ends of the inner channel members 54 are interconnected by a cross member 70 (Figure 2) from which a cross head 74 depends. Secured as at 76 in the lower end of the cross head 74 is the upper end of a piston rod 78, the lower end of which carries a piston head 80 which is reciprocable within a vertical single-acting hydraulic cylinder 82 (Figure 6), the lower end of which is mounted upon and secured to the cross member 46. The upper end of the cylinder 82 is provided with a cylinder head 84 through which the piston rod 78 passes.

In order to raise and lower the back plate 60 and the L-shaped forks 62 attached thereto, the cross head 74 is provided on its opposite sides with a pair of aligned horizontal threaded holes 86 (Figure 2) in which the threaded ends of headed stub shafts or axles 88 are securely seated. Rotatably mounted upon the stub shafts 88 are sprockets 90 over which pass the intermediate portions of sprocket chains 92 arranged in inverted U-shaped paths. One end of each sprocket chain 92 is secured to a chain anchorage 94 on the cross member 46 (Figure 6) while the other end thereof is secured to a chain anchorage 96 on one of the upper arms 56. Hydraulic fluid is transmitted to and withdrawn from the lower end of the hydraulic cylinder 82 by a pipe 98 which leads by way of a lift control valve (not shown) to the hydraulic circuit of the truck 12. As a consequence, when pressure fluid, such as oil under pressure, is supplied through the pipe 98 to the lower end of the cylinder 82, the piston 80 and piston rod 78 are forced upward, carrying with them the cross head 74 and moving the sprocket axles 88 and sprockets 90 upward. Since each of the sprocket chains 92 is anchored at one end at 94 to the base 46, its other end 96 which is secured to one of the upper arms 56 attached to the back plate 60 raises the back plate 60 and with it the forks 62 attached thereto. In this manner, the portable washing machine 10 is raised and lowered bodily.

The portable washing machine 10 is mounted upon and supported by a frame, generally designated 100, consisting of a pair of vertical side members 102 in the form of I-beams spaced apart from one another and secured at their lower ends to spaced inverted horizontal channel members 104 (Figure 2) having troughs 106 for receiving the lift forks 62 and braced by approximately triangular gusset plates 108 interconnecting the side members 102 and the horizontal channel members 104. Secured to and extending between the horizontal members 104 are spaced parallel supporting bars 110.

The I-beams 102 are drilled to receive the bolts 68 threaded into the back plate 60, in order to secure the washing machine 10 to the fork lift truck 12. Mounted on the upper ends of the I-beams 102 (Figure 2) are bearing blocks 114 having downwardly-extending legs 116 which are bolted as at 118 to the webs of the I-beams 102. The bearing blocks 114 are provided with aligned bearing bores 120 in which a horizontal shaft 122 is rotatably mounted. In order to rotate the shaft 122, one end thereof carries a worm wheel 124 (Figure 1) within a gear casing 126 which also contains a worm 128 meshing with the worm wheel 124, the worm 128 and worm wheel 124 being of the well-known self-locking type. The worm 128 is mounted on a worm shaft 130 which is journaled at its opposite end in the gear casing 126 and carries a hand crank 132 for rotating the worm 128 and consequently rotating the worm wheel 124 and shaft 122. The gear casing 126 is bolted or otherwise secured to the adjacent I-beam 102. Mounted on the opposite end of the horizontal shaft 122 from the worm wheel 124 is the hub 134 of a universally-jointed brush assembly support, generally designated 136, which is bored as at 137 to receive the shaft 122. The brush assembly support 136 consists of an outer rotary support, generally designated 138, and an inner rocking support, generally designated 140 (Figure 4). The outer support 138 includes a vertical bar portion 142 and an open-centered rectangular loop 144 integral with the hub 134 and having a horizontal rearward portion 146 disposed at right angles to the vertical bar portion 142. The sides of the loop 144 are bored and threaded in alignment as at 148 to receive threaded pivot studs 150, the inner unthreaded ends of which are seated in sockets 152 in the outer sides of the halves 154 of the inner rocking support 150 (Figure 4). The halves 154 roughly resemble pillow blocks or journal bearings and have half bores 156 which in assembly form a vertical full bore receiving the tubular brush support 158. The latter is clamped between the inner support halves 154 by the bolts 160, so as to securely lock the tubular brush support 158 in position. The tubular brush support 158, which also serves as a spray tube or nozzle, is yieldably mounted on the pivot studs 150 by means of upper and lower compression springs 162, the forward ends of which engage the tubular brush support 158 above and below its pivot studs 150. The rearward ends of the springs 162 are seated in threaded bores 164 which receive threaded abutment plugs 166 which have wrench attachment portions 168. When a wrench is applied to the attachment portions 168, the threaded plugs 166 may be rotated to move them into or out of the bores 164 and consequently to adjust the compression of the springs 162.

The tubular brush support 158 is bored at intervals along its height to receive lateral and central spray nozzles 170 and 172 respectively (Figure 7) which are arranged to spray water supplied to the brush support 158 outward in three directions. The central set of nozzles 172 sprays water directly upon the bristles of a rotary washing brush, generally designated 176, whereas the outer nozzles 170 are arranged to spray water directly upon the wall surface W of the vehicle or other article V to be washed (Figure 7). A spray guard 178, shown in solid lines only in Figure 7 and removed from the other views in order to avoid concealing the mechanism, confines the water thrown off by the brush 176 to the direction of the wall surface W being washed. For this purpose the spray guard 178 has vertically-elongated flared sides 180 connected to a back 182 having a trough-shaped portion 184 which receives and engages the rearward side of the vertical brush support and spray pipe 158. The spray guard 178 extends from top to bottom of the brush 176, and is shown in dotted lines in Figures 1, 2 and 3.

Mounted on the upper and lower ends of the tubular brush support 158 are upper and lower brush brackets 186 having hubs 188 bored at 190 (Figure 5) to receive the ends of the tubular brush support 158 and having bearing bosses 192 on their outer ends bored at 194 to receive the shaft 196 upon which the brush 176 is rotatably mounted. The brush 176 consists of a tubular hub 198 through which the shaft 196 passes and to which it is keyed or otherwise drivingly secured. Mounted side by side along the tubular hub 198 of the brush 176 are circular brush units 200 held in position by collars 202 some of which also serve to space the brush units 200 axially apart from one another. At its lower end the brush shaft 196 passes through a thrust collar or thrust bearing 204 (Figure 2) which rotatably sustains a part of the weight of the brush 176, the remainder being supported by an upper thrust collar or thrust bearing 206 of similar construction.

Drivingly secured to the brush shaft 196 above the upper bracket 186 are upper and lower pulleys 208 and 210. The upper pulley 208 is driven by a belt 212 from a pulley 214 on the output shaft 216 of a hydraulic rotary motor 218 (Figure 1) which is bolted to one side of the upper brush bracket hub 188. Pressure fluid is supplied to the hydraulic motor 218 and fluid discharged therefrom through the motor inlet and outlet connections 220 and 222 connected respectively to the flexible service pipes 224 and 226 which in turn are detachably connected to the service pipes 32 and 34 at the couplings 36 and 38.

Water under pressure is supplied to the spray nozzles 170 and 172 by a connection 228 threaded as at 230 into the upper end of the tubular brush support 158 (Figure 5) and having an angle bore 232 into one end of which a water pressure supply pipe 234 is threaded or otherwise connected. The water pipe 234 is U-shaped and leads to the outlet 236 of a water pump 238, the inlet 240 of which is connected to a water supply or suction pipe 242 leading downward to the coupling 244 near the bottom of the lowermost of two stacked water tanks 246 and 248. The lower tank 246 rests upon the bars 110 and is connected to the upper tank 248 by a connecting pipe 250 extending from one tank to the other. A filling spout 252 and a cap 254 provide for filling the two water tanks 246 and 248. The water pump 238 is a rotary pump having a drive shaft 256 carrying a pulley 258 which is driven by a belt 260 from the lower pulley 210.

In the operation of the invention, let it be assumed that the portable vehicle washing machine 10 is separated from the fork lift truck 12 and resting upon the floor F, supported by the channel members 104. Let it also be assumed that the lift truck 12 has been engaged in other duties, and that it is desired to wash a vertical wall surface W of a vehicle V. Let it also be assumed that the forks 62 have been properly spaced on the back plate 60. To mount the portable washing machine 10 upon the fork lift truck 12, the operator drives the latter, with the horizontal arm 63 of the forks 62 lowered to their lowest positions, into close proximity to the machine 10 so that the horizontal fork arms 63 enter the troughs 106 beneath the horizontal channel members 104, and the vertical fork arms 64 engage the rearward ends of the channel members 104. The bolts 68 are then inserted through their respective holes in the vertical I-beams 102 and the back plate 60 so as to lock the machine 10 and fork lift truck 12 together. The hydraulic fluid service pipes 224 and 226 are then connected at the couplings 36 and 38 to the service pipes 32 and 34 leading to the control valve 24 and thence through the service 28 and 30 to the hydraulic pumping unit (not shown) with which the truck 12 is regularly equipped.

The tanks 246 and 248 are filled with water and the lift valve (not shown) of the truck 12 operated to deliver hydraulic pressure fluid through the pipe 98 to the lower end of the vertical hydraulic cylinder 82, thereby causing the back plate 60 and lift forks 62 to rise in the manner set forth above in connection with the construction of the lift truck 12, lifting the portable washing machine 10 off the floor F into the position shown in Figures 1 and 2.

The operator now causes the lift truck 12 to travel to the location where the vehicle V is parked, if an automotive vehicle, or side-tracked, if a railway vehicle, and brings the brush 176 into line with the side wall surface W at one end of the vehicle, with the center line of the lift truck 12 parallel to the side wall surface W of the vehicle V. Assuming that the engine of the lift truck 12 is operating so as to cause pressure fluid to be supplied to the service pipes 28 and 30, the operator shifts the valve lever 26 of the control valve 24 to cause the hydraulic rotary motor 218 to operate, thereby causing its drive pulley 214 to rotate the brush shaft 196 through the pulley 208 and belt 212. If, as is probable, the brush 176 is too low to properly engage the surface W to be washed, the operator operates the lift mechanism to raise the entire machine 10 bodily until this positioning is accomplished.

As the brush 176 is rotated by means of the hydraulic motor 218, the water pump 238 is also driven by the lower pulley 210, belt 260 and the pump drive pulley 258 on the pump shaft 256, causing the pipe 242 to be placed in suction so as to withdraw water from the lower tank 246 and discharge it under pressure through the pipe 234 to the connection 228 at the top of the tubular brush support 158 (Figures 1 and 5). The water, thus placed under pressure, spurts outward from the nozzles 170 and 172 in the sprays S (Figure 7), the central spray S impinging directly upon the brush 176 and the outer sprays S upon the wall surface W of the vehicle V to be washed. The operator then drives the fork lift truck 12 in a path of travel parallel to the surface W, causing the rotary brush 176 to wash the dirt off the surface W as the brush 176 is moved along the surface W from one end of the vehicle to the other.

If on the one hand the brush 176 is not exactly parallel to the surface W in a plane perpendicular thereto, the tubular brush support 158 tilts bodily automatically upon the pivot studs 150, so that the brush 176 floats resiliently under the influence of the compression springs 162 (Figure 2). If on the other hand the brush 176 is not properly positioned in a vertical direction in a plane parallel to the surface S, the operator rotates the hand crank 132 so as to rotate the shaft 122 by means of the worm gearing 128, 124 until the proper positioning of the brush 176 is obtained.

If a vertical surface W is to be washed which is comparatively narrow in width, the shaft 122 may be rotated by means of the hand crank 132 and worm gearing 128, 124 to swing the brush shaft 196 and brush 176 into a horizontal position. The brush 176 is then caused to rotate as before, and water is supplied through the spray nozzles 170 and 172, whereupon the operator operates the lift cylinder 82 and lift forks 62 to move the entire machine, including the now horizontal brush 176 upward while the brush 176 washes the vertical surface W.

Thus, by the use of the portable washing machine 10, the washing apparatus can be taken directly to the wall or other surface W to be washed, and moved along the surface W by means of the lift truck or its lift mechanism while washing takes place. It will be obvious that while the principal use of the apparatus is for the washing of vehicles, its use is equally applicable to the washing of walls, fences, or other parts of building structures, tanks, and the like.

What I claim is:

1. A portable washing machine adapted to be transported and lifted upon the lift forks of a self-propelled fork-lift truck equipped with hydraulic pressure fluid generating means, said washing machine comprising a base adapted to receive said lift forks, an upstanding frame mounted on said base and having thereon a bearing unit with a horizontal bearing axis, a horizontal rotatable shaft journaled in said bearing unit of said frame, mechanism on said frame operatively engaging said shaft for adjustably rotating and locking said shaft in predetermined positions of rotation relatively to said frame, a brush supporting structure pivotally mounted on said shaft, an elongated rotary washing brush rotatably mounted on said structure, a washing liquid tank mounted on said base, a spray nozzle device mounted on said structure adjacent said brush, a pump having an intake connected to said tank and an outlet connected to said nozzle device, and motor means drivingly connected to said brush and pump.

2. A portable washing machine adapted to be transported and lifted upon the lift forks of a self-propelled fork-lift truck equipped with hydraulic pressure fluid generating means, said washing machine comprising a base adapted to receive said lift forks, an upstanding frame mounted on said base and having thereon a bearing unit with a horizontal bearing axis, a horizontal rotatable shaft journaled in said bearing unit of said frame, mechanism on said frame operatively engaging said shaft for adjustably rotating and locking said shaft in predetermined positions of rotation relatively to said frame, a brush supporting structure pivotally mounted on said shaft, an elongated rotary washing brush rotatably mounted on said structure, a washing liquid tank mounted on said base, a spray nozzle device mounted on said structure adjacent said brush, a pump having an intake connected to said tank and an outlet connected to said nozzle device, and motor means drivingly connected to said brush and pump, the pivot axis of said structure on said shaft being disposed substantially at right angles to the axis of rotation of said shaft.

3. A portable washing machine adapted to be transported and lifted upon the lift forks of a self-propelled fork-lift truck equipped with hydraulic pressure fluid generating means, said washing machine comprising a base including a pair of laterally-spaced parallel channel members having their troughs facing downwardly and adapted to receive said lift forks, an upstanding frame mounted on said base and connected to said channel members, a horizontal rotatable shaft journaled in said frame, mechanism on said frame operatively engaging said shaft for adjustably rotating and locking said shaft in predetermined positions of rotation relatively to said frame, a brush supporting structure pivotally mounted on said frame, an elongated rotary washing brush rotatably mounted on said structure, a washing liquid tank mounted on said base, a spray nozzle device mounted on said structure adjacent said brush, a pump having an intake connected to said tank and an outlet connected to said nozzle device, and motor means drivingly connected to said brush and pump.

4. A portable washing machine adapted to be transported and lifted upon the lift forks of a self-propelled fork-lift truck equipped with hydraulic pressure fluid generating means, said washing machine comprising a base adapted to receive said lift forks, an upstanding frame mounted on said base, a horizontal rotatable shaft journaled in said frame, mechanism on said frame operatively engaging said shaft for adjustably rotating and locking said shaft in predetermined positions of rotation relatively to said frame, a brush supporting structure including an elongated tubular structural brush-supporting member pivotally mounted on said shaft and having outwardly-projecting brackets connected to its opposite ends, an elongated rotary washing brush rotatably mounted in said brackets on said tubular member, a washing liquid tank mounted on said base, a spray nozzle device mounted on said tubular member adjacent said brush and communicating with the interior thereof, a pump having an intake connected to said tank and an outlet connected to the interior of said tubular member, and motor means drivingly connected to said brush and pump.

5. A portable washing machine adapted to be transported and lifted upon the lift forks of a self-propelled fork-lift truck equipped with hydraulic pressure fluid generating means, said washing machine comprising a base adapted to receive said lift forks, an upstanding frame mounted on said base, a horizontal rotatable shaft journaled in said frame, mechanism on said frame operatively engaging said shaft for adjustably rotating and locking said shaft in predetermined positions of rotation relatively to said frame, a brush supporting structure including an elongated tubular structural brush-supporting member pivotally mounted on said shaft and having outwardly-projecting brackets connected to its opposite ends, an elongated rotary washing brush rotatably mounted in said brackets on said tubular member, a washing liquid tank mounted on said base, a spray nozzle device mounted on said tubular member adjacent said brush and communicating with the interior thereof, a pump also mounted on said structure and having an intake connected to said tank and an outlet connected to the interior of said tubular member, and motor means drivingly connected to said brush and pump.

References Cited in the file of this patent

UNITED STATES PATENTS

| | | |
|---|---|---|
| 1,411,321 | Wright | Apr. 4, 1922 |
| 2,253,609 | Byron et al. | Aug. 26, 1941 |
| 2,626,198 | Wilson | Apr. 28, 1953 |
| 2,637,873 | Berenzy | May 12, 1953 |
| 2,697,846 | Wilcox et al. | Dec. 15, 1954 |